UNITED STATES PATENT OFFICE.

SILAS P. KNIGHT, OF BROOKLYN, NEW YORK.

IMPROVEMENT IN ELECTROTYPE-MOLDS.

Specification forming part of Letters Patent No. 157,965, dated December 22, 1874; application filed June 1, 1874.

*To all whom it may concern:*

Be it known that I, SILAS P. KNIGHT, of Brooklyn, in the county of Kings and State of New York, have invented an Improvement in the Treatment of Molds for Electrotyping, of which the following is a specification:

This invention consists in the use of glycerine and water, preferably having plumbago mixed with them, for coating the surface of the plastic material in the mold preparatory to taking the impression of the form therein. Said invention is applicable not only to molds in which the impression is to be made from type, but from other forms, including woodcuts, &c., and by it, instead of treating both the form and mold with plumbago, I am enabled to dispense with black-leading the form, thus saving much time and dirty work, yet insure the mold easily releasing itself from the form without injuring the impression by tearing the wax or plastic substance of the mold, and without drawing out the type (when the latter is used) from the form.

To enable others skilled in the art to make use of my invention, I will proceed more minutely to describe the same.

I take, for instance, about equal quantities of glycerine and water, and, preferably, about one ounce (1 oz.) of plumbago to a pint of such mixture, and apply the whole by means of a ball of carded cotton or a sponge to the surface of the wax or plastic substance in the mold before taking the impression of the form.

It may here be observed that the use of the water in connection with the glycerine is simply to dilute the latter so that the same may be applied in a thinner or lighter coat to the mold. Furthermore, it is not absolutely necessary that the plumbago should be mixed with the glycerine and water, inasmuch as the same may be applied to the mold dry or mixed with water, and the glycerine diluted by water applied afterward.

By treating the flat surface of the mold preparatory to the impression, instead of the form, the more or less intricate interstices of the form are in no wise choked by the plumbago and glycerine, and an even or regular coating is insured. The form, too, is kept clean, or only requires dusting off when or before taking the impression.

I claim—

The within-described process of treating electrotype-molds by the application of glycerine and water, with or without plumbago, to the surfaces of said molds before taking an impression of the form, substantially as specified.

SILAS P. KNIGHT.

Witnesses:
   MICHAEL RYAN,
   FRED. HAYNES.